United States Patent
Luepke

(10) Patent No.: US 10,190,612 B2
(45) Date of Patent: Jan. 29, 2019

(54) PLUG INSERT

(71) Applicant: Lockheed Martin Corporation, Bethesda, MD (US)

(72) Inventor: Richard A. Luepke, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 216 days.

(21) Appl. No.: 13/963,421

(22) Filed: Aug. 9, 2013

(65) Prior Publication Data
US 2015/0043994 A1 Feb. 12, 2015

(51) Int. Cl.
| | | |
|---|---|---|
| F16B 37/02 | (2006.01) | |
| F16B 13/02 | (2006.01) | |
| F16B 37/00 | (2006.01) | |
| F16B 37/12 | (2006.01) | |

(52) U.S. Cl.
CPC ............ F16B 13/02 (2013.01); *F16B 37/122* (2013.01); *F16B 2037/007* (2013.01)

(58) Field of Classification Search
USPC ..... 411/172, 103, 108, 132; 29/33.52; 470/5
See application file for complete search history.

(56) References Cited

U.S. PATENT DOCUMENTS

| | | | |
|---|---|---|---|
| 2,877,674 A | 3/1959 | Armacost et al. | |
| 3,338,069 A | 8/1967 | Ortloff | |
| 3,510,916 A * | 5/1970 | Phelan | 425/110 |
| 3,621,557 A * | 11/1971 | Cushman | 29/460 |
| 4,027,711 A * | 6/1977 | Tummarello | 411/172 |
| 4,341,053 A * | 7/1982 | Dettfurth et al. | 52/787.1 |
| 4,509,308 A * | 4/1985 | Dettfurth | F16B 5/01 411/180 |
| 4,902,180 A * | 2/1990 | Gauron | B29C 65/42 411/258 |
| 4,964,594 A * | 10/1990 | Webb | 244/131 |
| 5,290,131 A * | 3/1994 | Henriksen | 411/180 |
| 5,391,028 A * | 2/1995 | Charles | F16B 37/145 244/1 A |
| 5,603,472 A * | 2/1997 | Hutter, III | 244/132 |
| 5,673,927 A * | 10/1997 | Vermillion | A63C 5/003 280/14.22 |
| 6,042,126 A | 3/2000 | Mueller | |
| 6,183,181 B1 * | 2/2001 | Leistner et al. | 411/177 |
| 6,460,239 B2 * | 10/2002 | Newman | 29/460 |
| 6,511,274 B1 * | 1/2003 | Nagayama | 411/179 |
| 6,854,943 B2 * | 2/2005 | Nagayama | F16B 37/065 411/179 |

(Continued)

FOREIGN PATENT DOCUMENTS

| | | |
|---|---|---|
| DE | 20216816 U1 | 3/2003 |
| DE | 10241289 A1 | 3/2004 |

OTHER PUBLICATIONS

Extended European Search Report for Application No. 14178625. 1-1758, dated Jan. 30, 2015, 7 pages.

*Primary Examiner* — Gary W Estremsky
(74) *Attorney, Agent, or Firm* — Reising Ethington P.C.

(57) ABSTRACT

A plug insert comprising a shank configured to be removably received in a fastener hole in a panel in a position where an outer end of the plug insert is disposed adjacent an outer surface of the panel. A longitudinal cavity is disposed within the shank and a barrier is disposed on the plug insert to protect against damage and/or contamination.

12 Claims, 3 Drawing Sheets

(56) References Cited

U.S. PATENT DOCUMENTS

| | | | |
|---|---|---|---|
| 7,967,562 B2* | 6/2011 | Frost et al. | 415/197 |
| 8,658,072 B2* | 2/2014 | Baker | B28B 7/0011 |
| | | | 264/274 |
| 2001/0010115 A1 | 8/2001 | Newman | |
| 2007/0297869 A1* | 12/2007 | Kunda | 411/108 |
| 2009/0293421 A1* | 12/2009 | Erickson | E04C 2/365 |
| | | | 52/787.12 |

* cited by examiner

PLUG INSERT

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to a plug insert for a fastener hole in a panel.

Description of Related Art Including Information Disclosed Under 37 CFR 1.97 and 1.98

During the process of constructing an aircraft wing, a panel may be laid up over a previously-added skin panel. Once added, the overlaying "boot" panel covers fastener holes drilled in the skin panel, so matching holes must be drilled in the boot panel to enable fastener installation.

The overlay panel must therefore undergo a divot removal process, i.e., the removal of a portion of an overlay panel from a skin panel to uncover a fastener hole in the main panel. In other words, a small disk-shaped or annular aperture is made in the boot panel over a fastener hole in an aircraft skin panel to which the boot panel has been glued or otherwise adhered.

A common known divot removal process may include the following steps. A metal drill bushing is first placed in a fastener hole in an aircraft skin panel. An outer surface of the drill bushing is then masked, and a primer coat of paint is sprayed over an outer surface of the skin panel and the masked outer surface of the drill bushing. The masking is removed from the drill bushing and a boot panel is glued over the outer surface of the skin panel and the outer surface of the drill bushing. A pilot hole is back-drilled in the boot panel through a cylindrical axial cavity formed axially through the drill bushing. A boot cutter nose is then inserted into the pilot hole from the front or outer side and the cutter is advanced axially until circumferentially-disposed teeth of the boot cutter engage and cut a ring in the boot panel slightly larger in diameter than the front surface of the drill bushing and precisely concentric with the pilot hole.

The resulting annular boot panel divot is then removed from the outer surface of the drill bushing, and the drill bushing is removed so that a fastener can be inserted into the fastener hole.

Some fasteners, such as Dzus® quarter-turn fasteners, include metal sleeve portions shaped to complement the fastener holes. Such sleeve portions, when present, are installed in the fastener holes before the drill bushings are installed so that the drill bushings, once installed, are carried by and concentrically within the pre-installed metal sleeve portions of the fasteners.

SUMMARY

A plug insert comprising a shank configured to be removably received in a fastener hole in a panel, in a position where an outer end of the plug insert is disposed adjacent an outer surface of the main panel. A longitudinal cavity may be disposed within the shank, and a barrier disposed on the plug insert.

DRAWING DESCRIPTIONS

These and other features and advantages will become apparent to those skilled in the art in connection with the following detailed description and drawings of one or more embodiments of the invention, in which.

Figure 7:
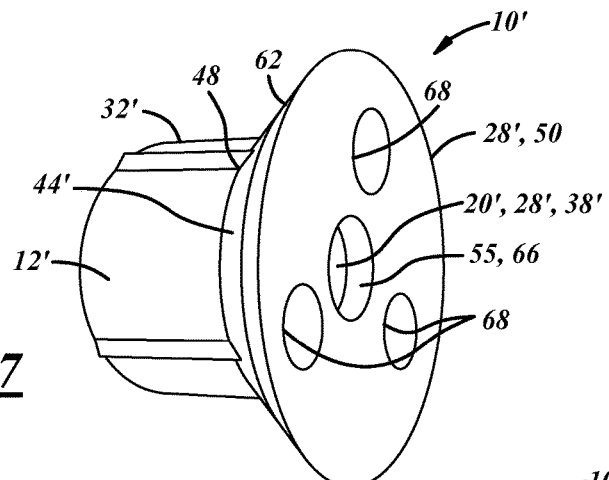
FIG. 7 is a perspective view of an alternate embodiment of the plug insert including a metal cap.
Figure 8:
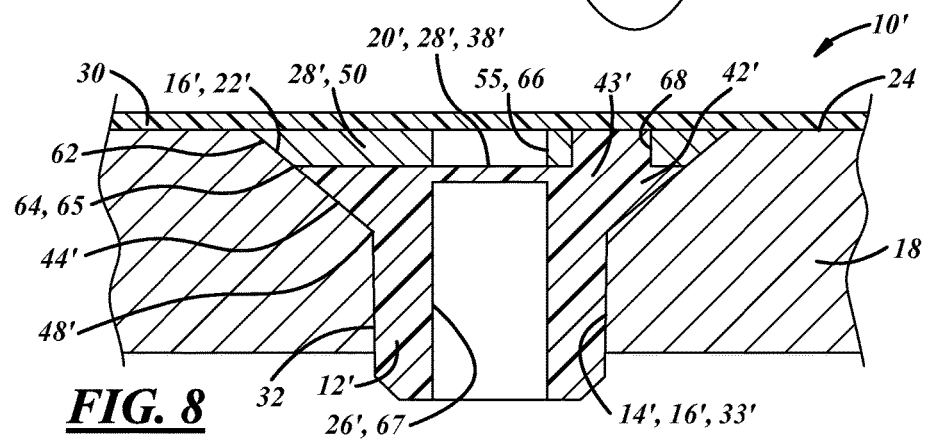
Figure 9:
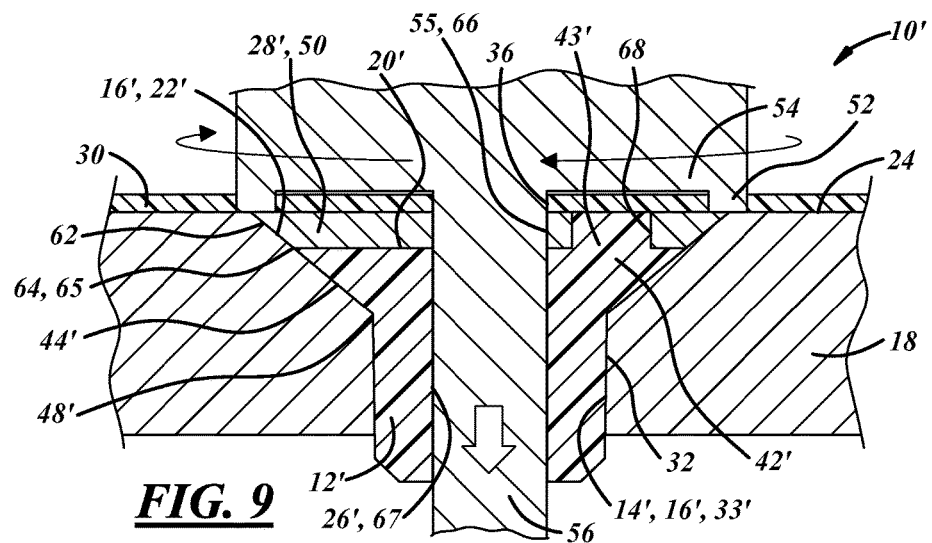

FIG. 8 is a cross-sectional view of the plug insert of FIG. 7 seated within a fastener hole of an aircraft skin panel and covered by a boot panel; and FIG. 9 is a cross-sectional view of the plug insert, skin panel, and boot panel of FIG. 7 with the nose portion of a boot cutter received in a longitudinal cavity of the plug insert and with circumferential boot cutter teeth engaging an outer edge of the metal cap after having cut through the boot panel.

DETAILED DESCRIPTION

A plug insert for guiding the removal of a divot from an overlay "boot" panel applied to a main panel to uncover a fastener hole in the main panel is generally shown at 10 in FIGS. 1-6. A second embodiment is generally shown at 10' in FIGS. 7-9. Reference numerals with the designation prime (') in FIGS. 7-9 indicate alternative configurations of elements that also appear in the first embodiment. Unless indicated otherwise, where a portion of the following description uses a reference numeral to refer to FIGS. 1-6, that portion of the description applies equally to elements designated by primed numerals in FIGS. 7-9.

Figure 2:
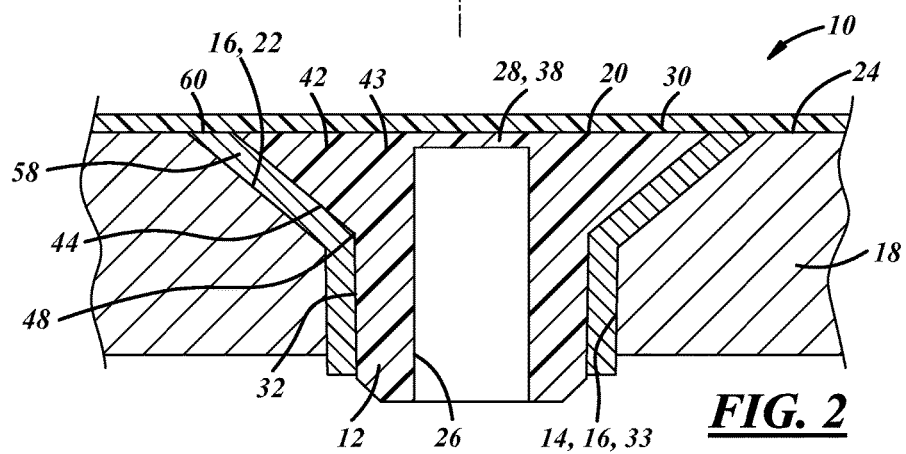
FIG. 2 is a cross-sectional view of the plug insert of FIG. 1 seated within a fastener sleeve received in a fastener hole of an aircraft skin panel and covered by a boot panel.

As shown in FIG. 2, the plug insert 10 may include a shank 12 configured to be removably received in an axially inner portion 14 of a fastener hole 16 in a panel such as (but not limited to) an aircraft skin panel 18. The shank 12 may be received in a position where a flat, generally planar outer end 20 of the plug insert 10 may be disposed in an axially outer portion 22 of the fastener hole 16 adjacent and generally flush and in a generally co-planar relationship with an outer surface 24 of the panel 18. The plug insert 10 may also include a longitudinal cavity 26 disposed within the shank 12. The plug insert 10 may also include a barrier 28 disposed on the outer end 20 of the plug insert 10 to protect against damage and/or contamination during the process of gluing a boot panel 30 over the outer surface 24 of the skin panel 18 prior to removing a divot from the boot panel 30.

As shown in FIG. 2, the shank 12 may have a radially outer circumferential side wall 32 shaped to complement a radially inner circumferential surface 33 of the axially inner portion 14 of the fastener hole 16 into which the shank 12 is to be received. The shank 12 may be generally cylindrical and may be sized to fill and provide an interference fit within the axially inner portion 14 of the fastener hole 16.

Figure 1:
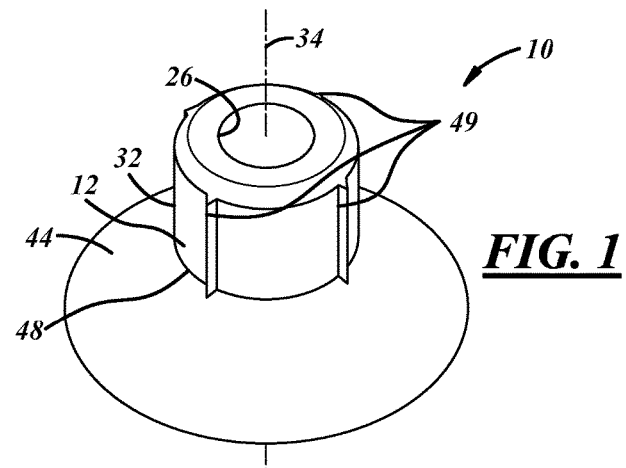
FIG. 1 is a perspective view of a plug insert.
Figure 3:
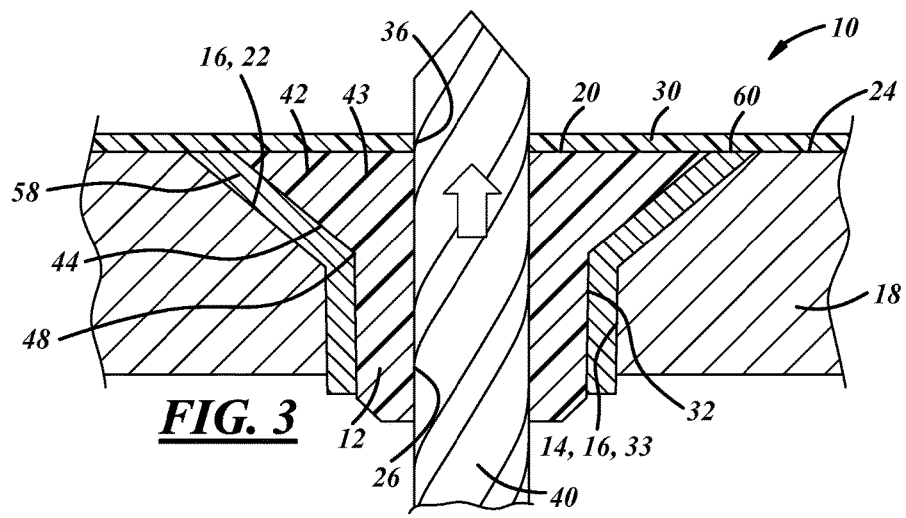
FIG. 3 is a cross-sectional view of the plug insert, fastener sleeve, skin panel, and boot panel of FIG. 2, showing a pilot hole being back-drilled through the boot panel via a longitudinal cavity of the plug insert.
Figure 4:
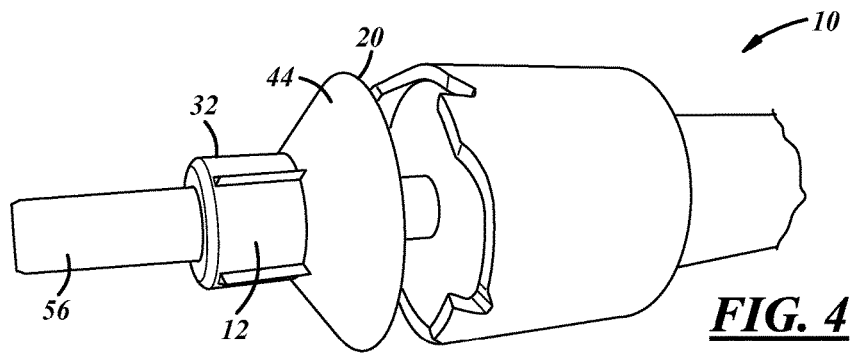
FIG. 4 is a perspective view of a nose portion of a boot cutter received in the longitudinal cavity of the plug insert of FIG. 1.

As shown in FIG. 1, the longitudinal cavity 26 may be generally cylindrical in shape, and may be disposed coaxially within the shank 12 along a central longitudinal axis 34 of the shank 12. The longitudinal cavity 26 may thus be concentrically disposed relative to the fastener hole 16 when the shank 12 is received in the fastener hole 16, as shown in FIG. 2, to guide the back-drilling of a pilot hole 36 in an overlying boot panel 30 as shown in FIG. 3. In other embodiments the longitudinal cavity 26 may have any shape suitable to guide back-drilling of the pilot hole 36.

As shown in FIG. 2, the barrier 28 may comprise a thin disk-shaped web 38 extending across and blocking the longitudinal cavity 26. As is also shown in FIG. 2, the web 38 may extend across an outer end of the longitudinal cavity 26, and may have an outer surface that is coplanar and/or continuous with the outer end 20 of the insert 10. The web 38 may be integrally formed with the shank 12 as a single unitary piece. The web 38 may prevent materials such as glue and/or spray coatings such as primer paint from fouling and/or passing through the longitudinal cavity 26 during primer and boot application operations of the boot panel divot removal process, while presenting minimal resistance to the passage of a pilot hole cutting tool 40 through the web 38 in a subsequent boot panel pilot hole back-drilling operation.

The shank 12 and web 38 may comprise glass-filled nylon for durability and for temperature resistance during boot panel pilot hole back-drilling. In a preferred embodiment, the shank 12 and web 38 may comprise 33% glass-filled nylon. In other embodiments the shank 12 and web 38 may comprise any suitable moldable material and, in embodiments where the shank 12 and web 38 comprise glass-filled nylon, any other suitable proportion may be used.

As best shown in FIG. 1, the plug insert 10 may include a head 42 that extends integrally and radially outward from around an axially outer portion 43 of the shank 12. The head 42 may be formed with the shank 12 as a single unitary piece. The head 42 may have a frustoconical circumferential side wall 44 shaped to complement the frustoconical axially outer portion 22 of a fastener hole 16 into which the plug 10 is to be inserted. The frustoconical wall 44 may thus be tapered to blend with the circumferential side wall 32 of the shank 12 at an inner end 48 and to terminate at the generally planar annular outer end surface 20 of the plug insert 10. In other words, the plug head circumferential side wall 44 may be continuous with that of the shank 12.

As is also best shown in FIG. 1, the plug insert 10 may include a plurality of longitudinal ribs 49 extending from and spaced around the shank 12 of the plug insert. These ribs 49 may be integrally formed with the shank 12 as a single unitary piece, may have generally triangular cross-sections, and may be sufficiently deformable to provide an interference fit that will prevent the plug insert 10 from rotating in response to torque application to the circumferential inner wall defining the longitudinal cavity 26 during pilot drilling, and to insure that the plug insert 10 remains concentric relative to the fastener hole 16. The ribs 49 are configured to allow finger pressure force to be used to insert the plug insert 10 into a fastener hole 16 while providing enough friction to retain the plug insert 10 in the fastener hole 16 during panel movement for drilling operations.

Figure 5:
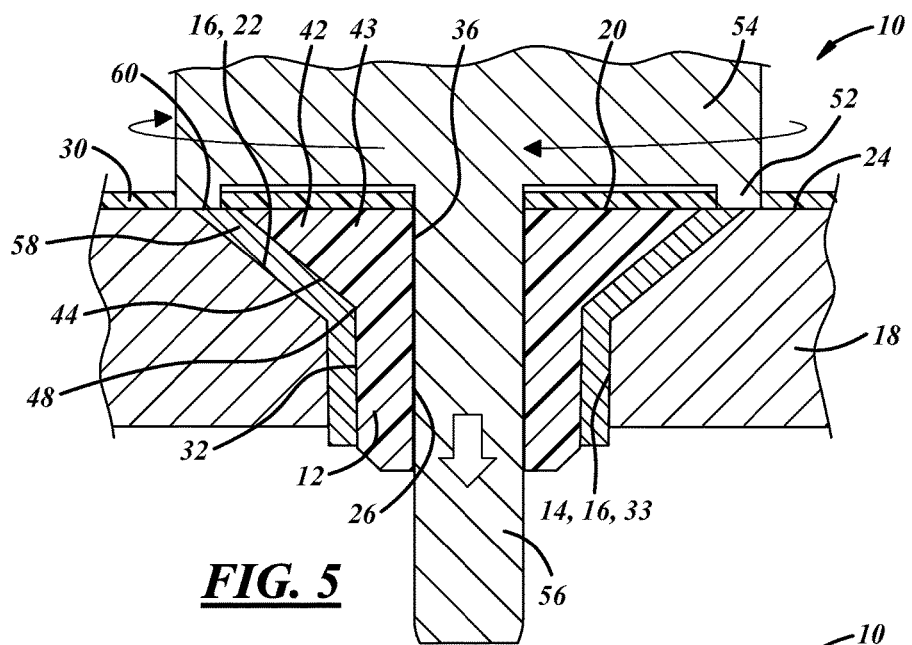
FIG. 5 is a cross-sectional view of the plug insert, fastener sleeve, skin panel, and boot panel of FIG. 3 with the nose portion of the boot cutter received in the longitudinal cavity of the plug insert and with circumferential boot cutter teeth engaging an upper rim of the fastener sleeve after having cut through the boot panel.
Figure 6:
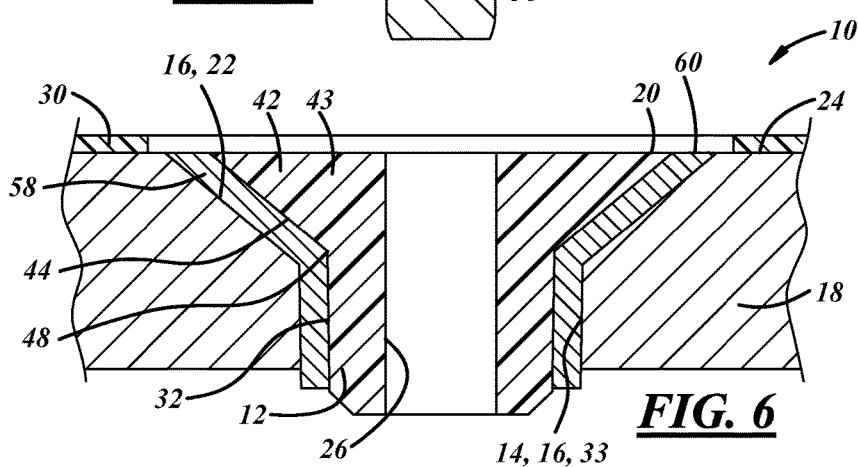
FIG. 6 is a cross-sectional view of the plug insert, fastener sleeve, skin panel, and boot panel of FIG. 5 with a portion of the boot panel having been cut by the boot cutter and removed.

According to the second embodiment, shown in FIGS. 7-9, the barrier 28' may also comprise an annular metal cap 50 to prevent circumferentially-disposed teeth 52 of a boot cutter 54 from cutting into the skin panel 18 around the fastener hole 16' during front cutting of the boot panel 30. The annular metal cap 50 may have a central through hole 55 axially aligned with the longitudinal cavity 26' to receive and/or guide an axially-extending nose portion 56 of the boot cutter 54 during boot panel front cutting as shown in FIG. 9, and to receive and/or guide the pilot hole cutter 40 (drill bit or hole saw) during pilot hole back drilling. The annular metal cap 50 may be used in applications where a metal fastener sleeve 58 is not installed in the fastener hole 16' before the plug insert 10' is installed. In applications where the metal fastener sleeve 58 is present, an upper circumferential edge 60 of the sleeve 58 arrests the boot cutter teeth 52, as shown in FIG. 5, preventing their incursion into the material of the surrounding panel 18.

As best shown in FIGS. 8 and 9, the annular metal cap 50 may have an outer frusto-conical circumferential surface 62 angled to match and lie flush with, the frusto-conical side wall 44' of the head 42', such that the cap 50 may have an outer diameter 64 greater than or equal to an outer diameter 65 of the head 42'. The cap 50 may also have an inner diameter 66 generally co-extensive with an inner diameter 67 of the longitudinal cavity 26. The cap 50 may be molded in place with the shank 12 and may comprise three off-axis through-holes 68 configured and positioned to receive molten shank material when the cap 50 is molded in place onto the shank 12. These holes 68 may secure the cap 50 to the shank 12 when the material hardens. In other embodiments, the cap 50 may comprise any number of through-holes 68 of any suitable shape.

A plug insert constructed according to the described embodiments allows accurate removal of portions of a boot panel layer obstructing fastener holes in an aircraft skin panel without damage to the skin panel. This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A plug insert comprising:
   a shank removably receivable in a fastener hole in a panel, in a position where an outer end of the plug insert is disposed adjacent an outer surface of the panel;
   a longitudinal cavity disposed within the shank;
   a head that extends integrally and radially outward from around the shank and that has a frustoconical circumferential side wall shaped to complement a frustoconical outer portion of a fastener hole into which the plug is to be inserted, the head being formed with the shank as a single unitary piece;
   an annular cap molded in-place on an outer end of the shank and having an axial through-hole axially aligned with the longitudinal cavity; and
   a web extending across and sealing off the longitudinal cavity.

2. A plug insert as defined in claim 1 in which the web is integrally formed with the shank as a single unitary piece.

3. A plug insert as defined in claim 2 in which the shank and web comprise glass-filled nylon.

4. A plug insert as defined in claim 3 in which the shank and web comprise 33% glass-filled nylon.

5. A plug insert as defined in claim 1 in which the shank has an outer circumferential surface shaped to complement an inner circumferential surface of an axially inner portion of a fastener hole into which the shank is to be received.

6. A plug insert as defined in claim 5 in which the shank is generally cylindrical.

7. A plug insert as defined in claim 6 in which the longitudinal cavity is generally cylindrical in shape and is disposed coaxially within the shank along a central longitudinal axis of the shank.

8. A plug insert as defined in claim 1 in which the annular cap is shaped and positioned to prevent panel damage from circumferentially-disposed boot cutter teeth that are concentrically located by an axial nose of the boot cutter received in the axial through-hole.

9. A plug insert as defined in claim 1 in which the web is positioned in an outer half of the longitudinal cavity adjacent the outer end of the plug insert.

10. A plug insert as defined in claim 1 in which the annular cap comprises a material more durable than the shank.

11. A plug insert comprising:
a shank removably receivable in a fastener hole in a panel, in a position where an outer end of the plug insert is disposed adjacent an outer surface of the panel;
a longitudinal cavity disposed within the shank;
an annular cap molded in-place on the shank and having an axial through-hole axially aligned with the longitudinal cavity, the annular cap being shaped and positioned to prevent a boot cutter from cutting into the outer surface of the panel around the fastener hole while cutting through a boot layer disposed over the outer surface of the panel and the outer end of the plug insert; and
the cap comprising at least one off-axis through-hole shaped and positioned to receive molten shank material when the cap is molded in place with shank.

12. A plug insert comprising:
a shank removably receivable in a fastener hole in a panel, in a position where an outer end of the plug insert is disposed adjacent an outer surface of the panel;
a longitudinal cavity disposed within the shank;
an annular cap molded in-place on an outer end of the shank and having an axial through-hole axially aligned with the longitudinal cavity, the cap comprising at least one off-axis through-hole shaped and positioned to receive molten shank material when the cap is molded in place with the shank; and
a web extending across and sealing off the longitudinal cavity.

* * * * *